United States Patent
Smith, Jr. et al.

[11] Patent Number: 5,816,498
[45] Date of Patent: Oct. 6, 1998

[54] OZONATION SYSTEM FOR AGRICULTURAL CROP AND FIELD SPRAYER

[75] Inventors: Charles E. Smith, Jr., Rockledge, Fla.; David O. Burrell, Collins, Ga.

[73] Assignee: Ozone Technologies, Inc., Marietta, Ga.

[21] Appl. No.: 760,065

[22] Filed: Dec. 4, 1996

[51] Int. Cl.⁶ ................................. A01G 25/09
[52] U.S. Cl. ................ 239/172; 239/159; 47/1.01
[58] Field of Search .................. 239/159, 172; 47/1.01

[56] References Cited

U.S. PATENT DOCUMENTS

| | | | |
|---|---|---|---|
| 1,656,171 | 1/1928 | Cox | 239/159 X |
| 4,172,786 | 10/1979 | Humphrey et al. | 210/57 |
| 4,422,450 | 12/1983 | Rusteberg | 128/62 |
| 4,549,477 | 10/1985 | McCabe, Jr. | 99/477 |
| 4,849,237 | 7/1989 | Hurst | 426/332 |
| 5,181,399 | 1/1993 | Engel et al. | 68/13 |
| 5,266,216 | 11/1993 | Agueda et al. | 210/760 |
| 5,269,943 | 12/1993 | Wickramanayake | 210/747 |
| 5,366,154 | 11/1994 | Thompson | 239/172 X |
| 5,403,602 | 4/1995 | Endico | 426/231 |
| 5,431,861 | 7/1995 | Nagahiro et al. | 261/140 |
| 5,433,866 | 7/1995 | Hoppe et al. | 210/748 |
| 5,493,743 | 2/1996 | Schneider et al. | 8/149.2 |
| 5,514,345 | 5/1996 | Garbutt et al. | 422/124 |
| 5,520,893 | 5/1996 | Kasting, Jr. et al. | 422/305 |
| 5,561,944 | 10/1996 | Ismail et al. | 47/58.11 |
| 5,566,627 | 10/1996 | Pryor | 111/118 |

*Primary Examiner*—Lesley D. Morris
*Assistant Examiner*—Robin O. Evans
*Attorney, Agent, or Firm*—Brian S. Steinberger; Law Offices of Brian S. Steinberger

[57] ABSTRACT

A portable agricultural field and crop sprayer vehicle produces and applies ozonated water to a field of growing crops, such as but not limited to Vidalia onions, to treat or prevent various bacterial or fungal diseases. The tractor vehicle includes equipment which dissolves ozone in water while traversing a field and maintains the dissolved ozone at a desired concentration so that freshly ozonated water is sprayed directly onto the growing crops at an optimum selected concentration.

14 Claims, 6 Drawing Sheets

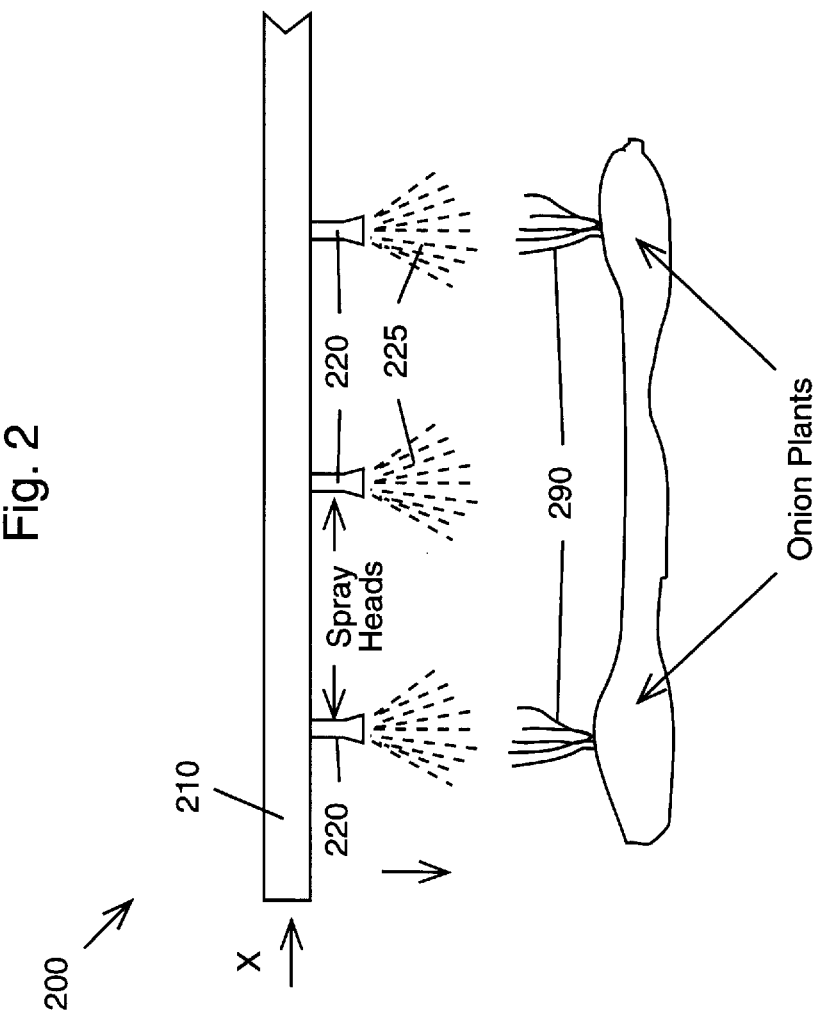

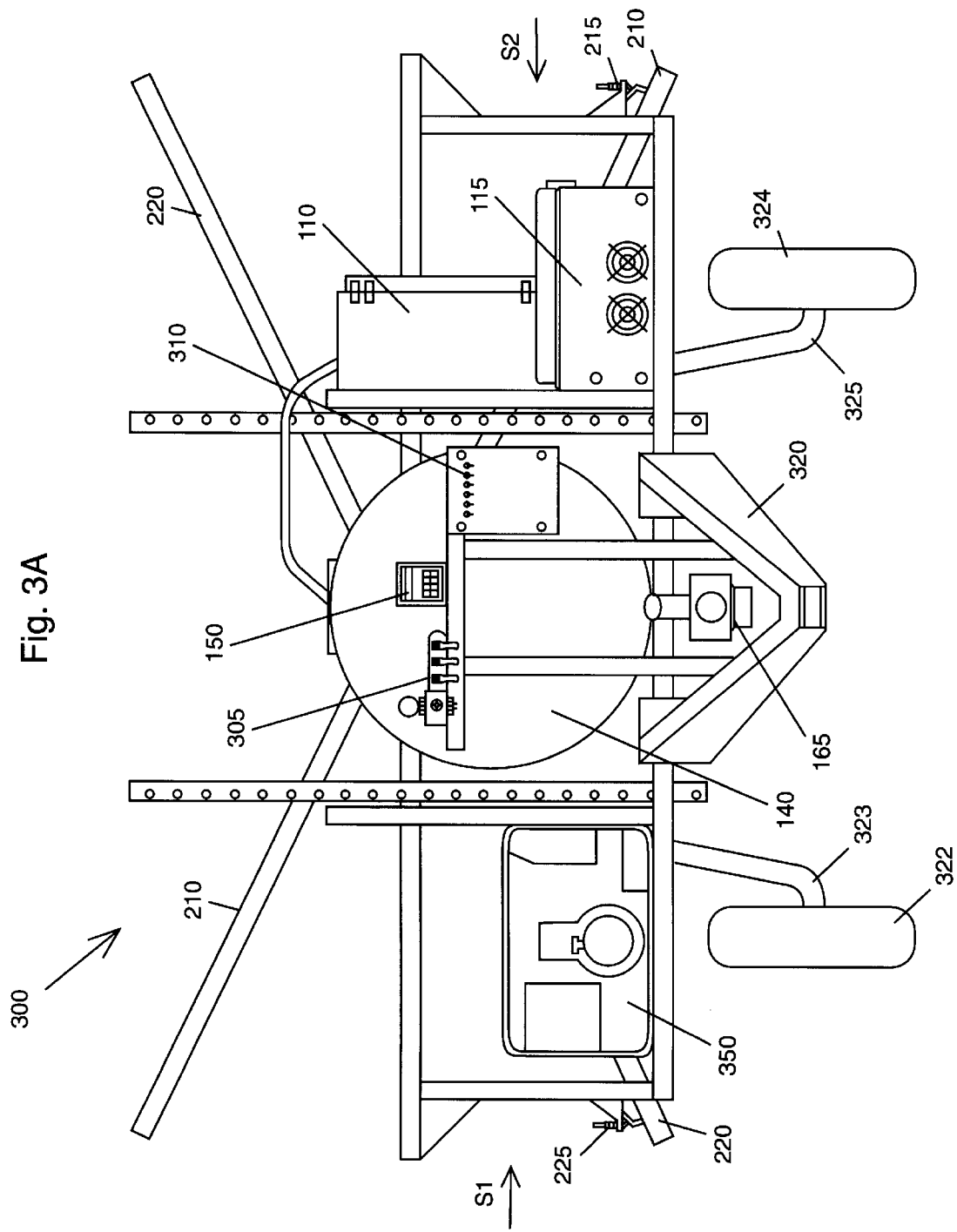

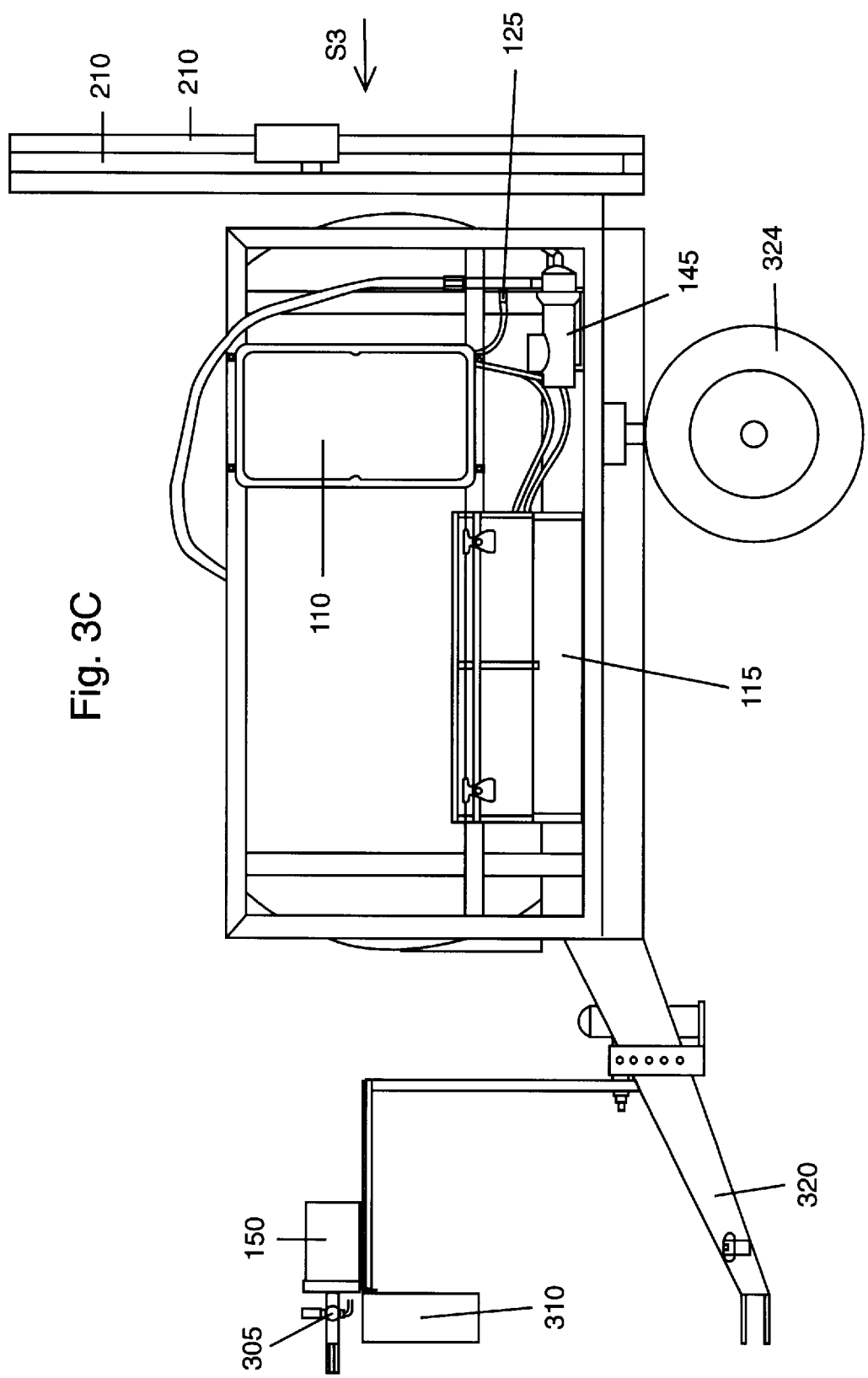

OZONATION SYSTEM FOR AGRICULTURAL CROP AND FIELD SPRAYER

This invention relates to an ozone system, and in particular to a method and apparatus for spraying ozonated water on growing crops to treat and prevent bacterial, fungal and viral diseases.

BACKGROUND AND PRIOR ART

Agricultural crops such as Vidalia onions suffer from many diseases that can result in significant costs to farmers in terms of chemical treatments. Furthermore, there are many diseases for which there are few or no known chemical treatments available to slow or stop their progress. One such disease is bacterial streak and bulb rot in Vidalia onions.

Various U.S. patents have used ozone treatment for food products but fail to solve any of the problems described above. U.S. Pat. No. 5,514,345 to Garbutt et al. and U.S. Pat. No. 5,403,602 to Endico each describes using ozone for preserving food products. U.S. Pat. No. 4,549,477 to McCabe, Jr. describes an ozone system for sterilizing dehydrated vegetables. U.S. Pat. No. 4,849,237 describes a system for sanitizing poultry with ozone treatment. Other known ozone systems which also fail to solve the above identified problems include U.S. Pat. Nos. 4,172,786 to Humphrey et al; 4,849,237 to Hurst; 5,181,399 to Engel et al.; 5,266,216 to Agueda et al.; 5,431,861 to Nagahiro et al.; 5,493,743 to Schneider et al.; 5,520,893 to Kasting, Jr. et al.

SUMMARY OF THE INVENTION

The first objective of the present invention is to provide a ozonation system that mounts to an agricultural crop and field sprayer to dissolve ozone in the water being sprayed on plants while still in the field.

The second object of this invention is to provide a water based dissolved ozone sprayer system for functioning as a bactericide, fungicide, virucide and pesticide for agricultural crops.

The third object of this invention is to provide a system for functioning as a bactericide, fungicide, virucide and pesticide for agricultural crops that is environmentally friendly as compared to traditional chemical treatments.

The fourth object of this invention is to provide a bactericide, fungicide, virucide and pesticide for agricultural crops that requires no external chemicals other than water.

The fifth object of this invention is to provide a bactericide, fungicide, virucide and pesticide for agricultural crops which can be substantially less costly than traditional chemical treatments.

The sixth object of this invention is to provide a system that allows for the treatment of diseases for which there are limited or no known available control agents such as bacterial streak and bulb rot.

A preferred embodiment of the tractor sprayer system for delivering ozone-water to treat agricultural crops includes a water tank, an oxygen generator, electric generator and ozone generator for producing ozone gas, a Venturi injector and pump for injecting gaseous ozone into the recirculated water to form the ozone-water mixture, a tractor for transporting the storage means, and spray arms and spray heads on the vehicle for delivering the ozone-water mixture to treat diseases from occurring on agricultural crops. An analytical dissolved ozone analyzer constantly determines the amount of ozone that is dissolved in the water tank and is used to hold the dissolved ozone level in the tank at a constant level. A recirculation pump feeds water from the water tank to the Venturi injector. A method of using the apparatus is also disclosed.

Further objects and advantages of this invention will be apparent from the following detailed description of a presently preferred embodiment which is illustrated schematically in the accompanying drawings.

BRIEF DESCRIPTION OF THE FIGURES

FIG. 2 illustrates an agricultural crop and field sprayer arm which is supplied by the ozonation system of FIG. 1.

FIG. 3A is a front view of a preferred embodiment of the ozone agricultural crop and field sprayer.

FIG. 3C is a left side view of the ozone agricultural crop and field sprayer of FIG. 3A along arrow S2.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
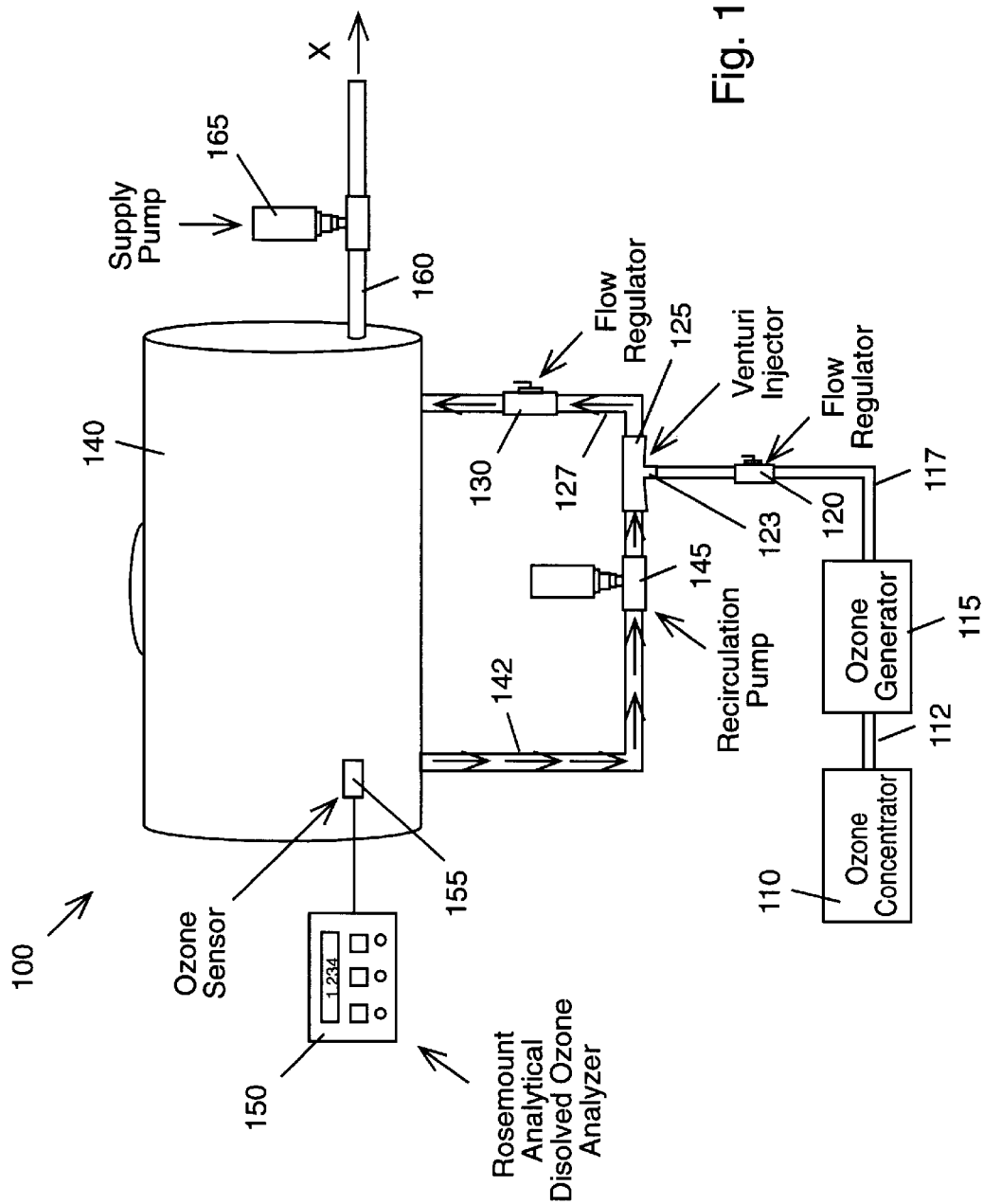
FIG. 1 illustrates the ozonation system for supplying ozonated water to the agricultural crop and field sprayer.

FIG. 1 illustrates the ozonation system 100 for supplying ozonated water to an agricultural crop and field sprayer arm 200 shown in FIG. 2. Referring to FIGS. 1–2, ozonation system 100 includes an oxygen concentrator 110, such as an oxygen concentrator(6L) manufactured by Medical Repair Services, Inc., Part No. OXLIFE L-6, which feeds a high concentration of oxygen gas direction through line 112 into an ozone generator 115, such as a Guardian Manufacturing Model No. OZ-2000. Flow Regulator 120 can be a Key Instruments, RF-2A15-S-VVT, 1–101 pm flow meter. Flow tank 140 can be a 400 gallon water treatment tank. Ozone Sensor 155 can be a Rosemount Analytical, Inc., Model # 04990Z Sensor Assembly. Supply Pump 165 can be a recirculation pump used by the sprayer.

Referring to FIGS. 1–2, the highly concentrated gas from oxygen concentrator 110 produces high concentrations of ozone at relatively low flow rates of approximately 3 liters per minute. Dissolved ozone concentrated in water is approximately 0.1 to approximately 4.0 ppm. The 02 flow rate is approximately 3 to approximately 6 lpm. The 03 flow rate is approximately 3 to approximately 6 lpm. Concentrations of ozone are approximately 150 mg/L. The recirculation pump 165 flows at approximately 20 gallons per minute.

Referring to FIGS. 1–2, ozone generator 115 comprises two or more "ozone cells" which are used to generate the ozone that is eventually dissolved in 400 gallon water tank 140. In ozone generator 115, a 10,000 volt potential at 1000 Hz is applied across two conductive elements with a glass dielectric between them. The oxygen gas is passed between the gap created between the glass dielectric surface and one of the conductive elements. The result is the oxygen is broken down and a percentage of the oxygen molecules reform as the ozone(O3) molecule. Ozone passes along line 117 to flow regulator 120 and into Venturi injector 125, which can be manufactured by Mazzei, part no. KYNAR 1583-A. Once the ozone gas is formed, recirculation pump 145 is used to force water from tank 140 through line 142 through injector 125. The recirculation pump 145 can be a 2HP manufactured by Gould Pump Co., part no. 1ST1E2C3. Water passing through injector 125 creates a vacuum at the injector port 123. The output of ozone generator 115 is connected to the suction side 123 of Venturi port 125. Flow regulator 120 is used to restrict the amount of ozone flow to the injector 125 and to ensure proper flow ratios within the injector 125. The goal of the injector 125 is to form very small(micro) ozone bubbles within the water that passes along line 160. The smaller the bubble size, the higher the dissolved ozone concentration in the water. Recirculation pump 145 is used to circulate water through injector 125 and continually ozonate the water at the desired concentration.

Referring again to FIGS. 1–2, the Rosemount Dissolved Ozone Analyzer 150, manufactured by Rosemount Analytical, Model No. 1054A, is connected to ozone sensor 155 inside 400 gallon water tank 140 is used to determine how much dissolved ozone is actually in the water. This parameter value is critical for two reasons. First, there is a need to know the exact treatment levels in order to ensure the treatment level is appropriate for the type of treatment being performed. Ozone concentration in the water can vary significantly based on outside temperature, humidity and water quality. Secondly, the ozone concentration must always be held at a constant level to ensure consistency from treatment to treatment. In addition, it is also critical to know the dissolved ozone concentration in the water to avoid plant damage. Excessive levels of dissolved ozone in the water can damage and even kill the crops receiving treatment. Therefore, the use of a measurement device to determine ozone levels in the sprayer tank is mandatory to achieve high levels of success. A supply pump 165 is used to supply ozonated water to pass along line 160 in the direction of arrow X to agricultural crop and field sprayer arm 210 which supplies the ozonated water by spray heads 220 to the tops of crops 290 such as onion plants.

Figure 3B:
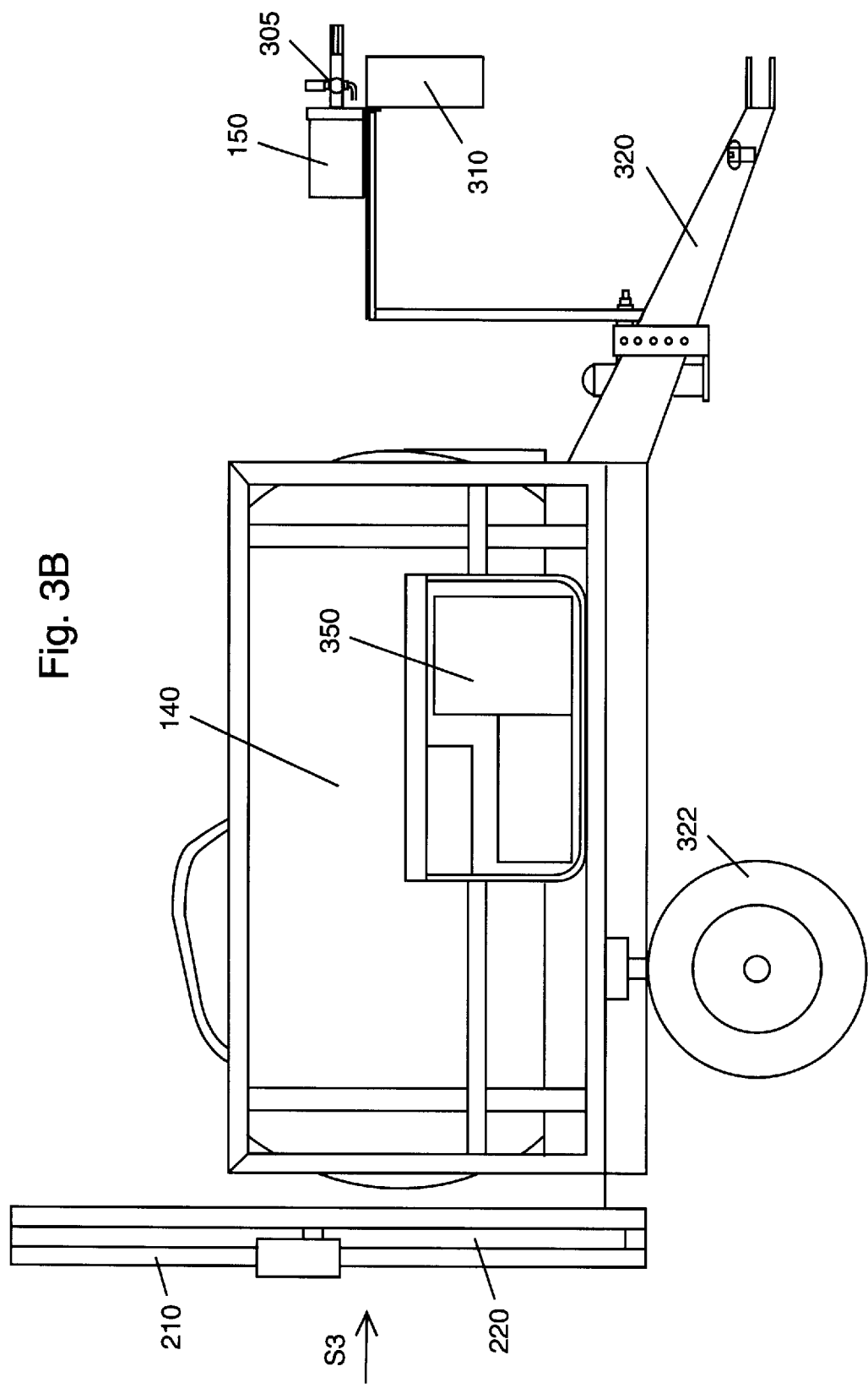
FIG. 3B is a right side view of the ozone agricultural crop and field sprayer of FIG. 3A along arrow S1.
Figure 3D:
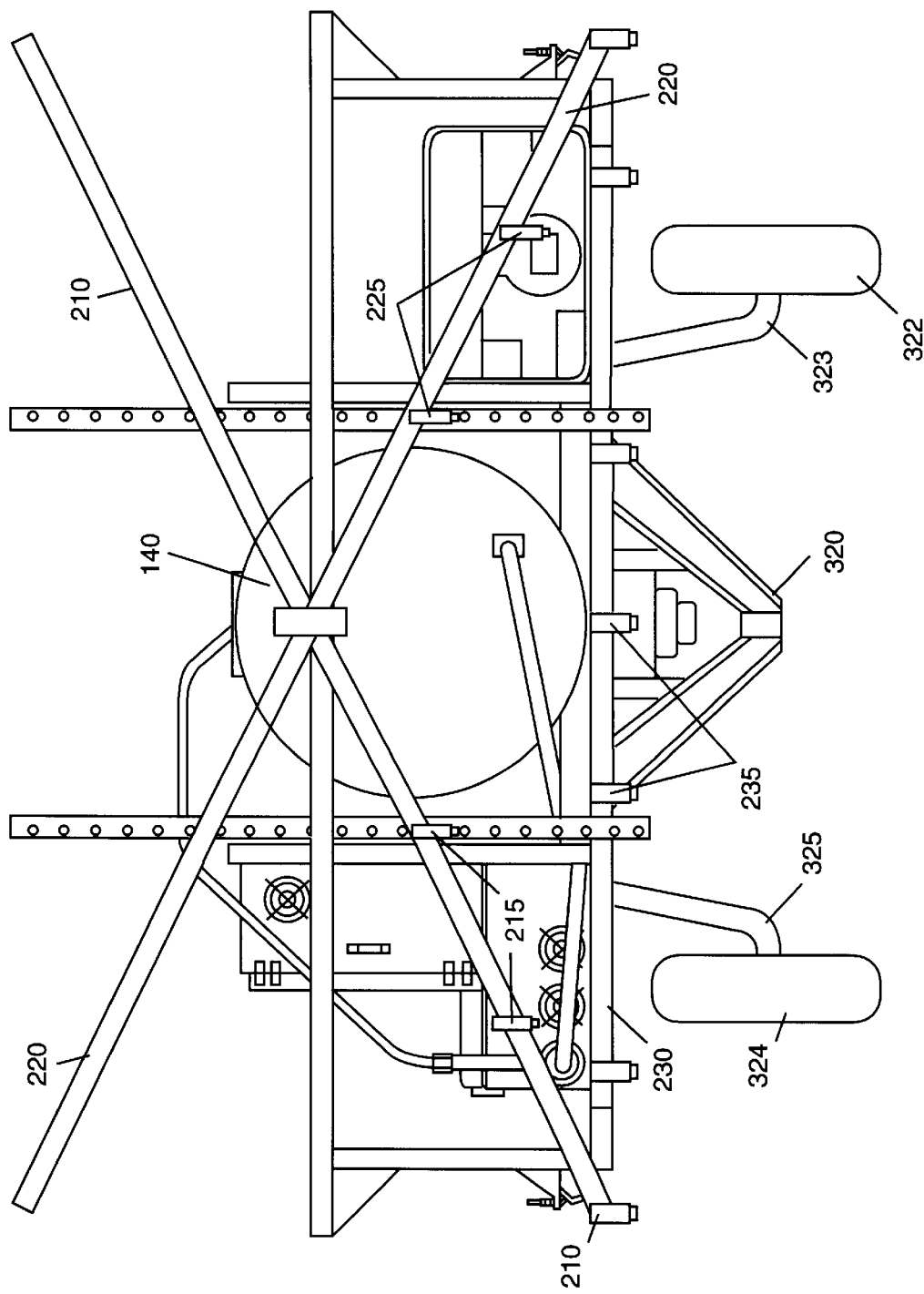
FIG. 3D is a rear view of the ozone agricultural crop and field sprayer of FIGS. 3B–3C, along arrow S3.

FIG. 3A is a front view of a preferred embodiment 300 of the ozone agricultural crop and field sprayer. FIG. 3B is a right side view of the ozone agricultural crop and field sprayer 300 of FIG. 3A along arrow S1. FIG. 3C is a left side view of the ozone agricultural crop and field sprayer 300 of FIG. 3A along arrow S2. FIG. 3D is a rear view of the ozone agricultural crop and field sprayer 300 of FIGS. 3B–3C, along arrow S3. The components shown in FIGS. 1–2, are incorporated in the tractor agricultural crop and field sprayer 300 of FIGS. 3A–3D. Agricultural crop and field sprayer 300 travels over ground level by being elevated by vertical axle supports 323, 325 which are attached to wheels 322, 324. Sprayer arms 210, 220 and 230 each have respective sprayer heads 215, 225, 235. Control Valves and Pressure gauge 305 are standard equipment on sprayers and are not part of the subject invention. The control Panel 310 used can be one manufactured by Ozone Technologies, Model-SW-245. Panel 310 provides the on/off control for the recirculation pump 145, oxygen concentrator 110, ozone generator 115 and dissolved ozone analyzer 150. Generator 350 can be a Homelite, Model #LRI5000, 220, 3 phase electrical generator. Generator 350 provides a three phase, 220 VAC electrical power supply to the ozone generating and distribution system. The generator provides power to the recirculation/injection pump 145, Rosemount Analyzer 150, ozone generator 115 and oxygen concentrator 110. During operation, approximately 85 to approximately 90% pure oxygen flows from oxygen concentrator 110 to ozone generator 115 via flow line 112. Ozone generated from ozone generator 115 flows through line 117 to the Venturi injector 125. Ozonated water flows in line 127 after ozone has been introduced to the water via the Venturi injector 125. Recirculated water flows through line 142.

Typical operating parameters with concentration levels will now be discussed in reference to FIGS. 1–3. The invention can be operated in the temperature range of approximately 95 degree F. down to approximately 33 degree F. Tank 140 can be filled with water charged to 2× the selected treatment range. With 3 LPM, 2 generators 115 and a 1 hp pump this will take approximately 30 to approximately 50 minutes. After obtaining a 2× treatment level the 03 level is reduced through tank 140 recirculation with generator 115 to achieve a "stable" ozone concentration. After obtaining the target dose the generator(s) 115 are turned on and off in order to maintain the target treatment level within +20%/−10%. As the volume of water in the tank 140 is reduced, it can be difficult to stay within these values. Dosage level's used in order to "arrest" disease advancement ranges from approximately 0.3 ppm to as high as approximately 1.24 ppm with an average of approximately 0.6 ppm. Application rates have averaged approximately 65 GPA(Gallons Per Acre) with a high of approximately 100 GPA and a low of approximately 30 GPA. Nozzle pressure (220 FIG. 2) has averaged 140 PSI with experiments done at pressures from approximately 40 psi to approximately 200 psi. Nozzles 220 FIG. 2, can be cone, hollow cone, and flat spray made from ceramics, stainless steel, brass, plastic and the like. Initially an application can be at approximately 65 to 75 GPA, with pressure levels of approximately 150 psi using a hollow cone ceramic spray nozzle with two dosage levels of 0.3 and 0.6 ppm as a preventative eradicant. In some instances, levels above 1 ppm can be used when disease symptoms are observed.

Initial tests using the system of FIGS. 1–2 were conducted on test plots of Vidalia onions with treatments at 1–2 week intervals for approximately one month. The initial results indicated that the use of ozonated water produced using this system were effective in the treatment of Bytritis, a fungal disease.

The agricultural crop and field sprayer 300 of FIGS. 3A–3D, was used at periodic intervals(once per week) from February through mid-May, 1996(harvest) to treat a two acre plot of Vidalia onions. No chemicals other than herbicides were used for weed control from mid-March through mid-May, 1996. Under normal conditions without any type of chemical treatment, the entire onion field would have been completely destroyed by disease. For most of test period, the field was observed to contain a healthy field of onions.

During the last two weeks prior to the 1996 onion harvest, a disease developed on some Vidalia onions known as bacterial streak and bulb rot. This disease sometimes known as neck rot and can devastate an entire crop of onions in an extremely short time frame. One day the entire field can be perfect, the next day a 20% loss can occur. The results indicated that ozone treatment slowed the spread of the disease in the field by 150% as compared to test plots with no ozone applied. Clearly, the test results indicated ozonated water can be useful as disease control agent for agricultural crops such as onions.

Although the preferred embodiment describes using ozonated water in a sprayer as a disease control agent for onions, the invention has application on other types of vegetables such as but not limited to potatoes, peanuts, squash, cucumbers and fruits.

The invention has applicability to controlling various target diseases. A partial listing of the main target diseases to be controlled and their causal agents is shown in Table 1.

TABLE 1

| DISEASE | CAUSAL AGENTS |
|---|---|
| Botrytis Neck Rot & Botrytis Leaf Blight | *Botrytis allii, Botrytis byssoidea, Botrytis cinerea, Botrytis squamosa, Botrytis porri.* |
| Downy Mildew | *Peronospora destructor* |
| Purple Blotch | *Alternaria porri* |
| Rust | *Puccinia porri* |
| Smut | *Urocystis colchici* |
| Stemphylium Leaf & Stalk Rot | *Stemphylium vesicarium* |
| Black Mold | *Aspergillus niger* |
| Blue Mold | *Penicillium aurantiogriseum, citrinum, funiculosum* |
| Mushy Rot | *Rhizopus microsporus, Rhizopus stolonifer* |
| Smudge | *Collectotrichum circinans* |
| Leaf Streak & Bulb Rot | *Pseudomonas viridiflava* |
| Soft Rot | *Erwinia carotovora* |
| Sour Skin | *Burkholder cepacia*(formerly *Pseudomonas cepacia*) |
| Slippery Skin | *Pseudomonas gladioli* |

While the preferred embodiment is described in terms of spraying non aerated, non statically charged, pressurized water (approximately 15 to 650 psi), other application methods such as but not limited to an electrostatic spray where a static charge is added to the spray droplet, and a misted blower where air is added or mixed to the spray mist with a large volume of blown air.

Although the preferred embodiment is described in terms of a platform pulled behind a tractor, the invention can be used as part of a tractor mount where the spray tank(s) and spray equipment are physically mounted on the tractor itself, or as a motorized sprayer where the equipment is built solely for the purpose of spraying with the tractor mounted on an elevated platform to travel above the crops being treated.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A portable ozone sprayer useful as a disease and pest control agent for agricultural crops, comprising:

a water tank;

means for producing ozone bubbles;

means for inputting the ozone bubbles to the water tank to produce an ozone-water mixture;

a vehicle for transporting the water tank, the ozone-bubbles producing means, and the imputing means; and a delivery means on the vehicle for delivering portions of the ozone-water mixture to treat bacterial, fungal and viral diseases occurring on agricultural crops.

2. The portable ozone sprayer of claim 1, further comprising:

an ozone analyzer for sensing the amount of dissolved ozone exists in the water tank.

3. The portable ozone sprayer of claim 2, further comprising:

a sprayer arm attached to the spray head.

4. The portable ozone sprayer of claim 1, wherein the ozone bubble inputting means includes:

a Venturi injector.

5. The portable ozone sprayer of claim 4, further comprising:

a recirculation pump for feeding water from the water tank to the Venturi injector.

6. The portable ozone sprayer of claim 5, further comprising:

a flow regulator for for restricting the amount of ozone flowing to the injector.

7. The portable ozone sprayer of claim 1, wherein the means for producing ozone includes:

an oxygen generator; and an ozone generator for receiving a high concentration of oxygen gas from the oxygen generator to produce an ozone gas.

8. The portable ozone sprayer of claim 1, wherein the delivery means includes:

at least one spray head.

9. The portable ozone sprayer of claim 1, wherein the vehicle is chosen from one of:

a tractor and a self contained agricultural sprayer.

10. An agricultural crop and field sprayer system for delivering ozone-water to treat bacterial, fungal, and viral diseases from occurring in agricultural crops, comprising:

a water tank;

means for producing ozone; and a Venturi injector for supplying the ozone to the water tank to produce an ozone-water mixture;

a vehicle for transporting the storage means; and a spray means on the vehicle for delivering portions of the ozone-water mixture to treat bacterial, fungal and viral diseases occurring on agricultural crops.

11. The agricultural crop and field sprayer system for delivering ozone-water of claim 10, wherein the supplying means includes:

means for inputting ozone micro bubbles into water coming from the water tank.

12. A method of using a bactericide, fungacide, virucide and pesticide spray on agricultural crops comprising the steps of:

(a) forming a mixture of ozonated water by injecting ozone bubbles into water;

(b) transporting the ozonated water mixture over a ground surface on a vehicle;

(c) delivering the ozonated water mixture from the vehicle in order to prevent and treat the occurrence of bacterial, fungal or viral diseases and pest damage on agricultural crops.

13. The method of using the bactericide, fungacide, virucide and pesticide of claim 12, wherein the transporting step(b) includes a vehicle chosen from one of:

a tractor and a self contained agricultural sprayer.

14. The method of using the bactericide, fungacide, virucide and pesticide of claim 12, wherein the delivering step(c) includes:

a sprayer.

* * * * *